US008549592B2

(12) United States Patent
Bade et al.

(10) Patent No.: US 8,549,592 B2
(45) Date of Patent: Oct. 1, 2013

(54) ESTABLISHING VIRTUAL ENDORSEMENT CREDENTIALS FOR DYNAMICALLY GENERATED ENDORSEMENT KEYS IN A TRUSTED COMPUTING PLATFORM

(75) Inventors: Steven A. Bade, Georgetown, TX (US); James Patrick Hoff, Wake Forest, NC (US); Siegfried Sutter, Boeblingen (DE); James Peter Ward, Apex, NC (US); Helmut H. Weber, Dettenhausen (DE)

(73) Assignee: International Business Machines Corporation, Armonk, NY (US)

( * ) Notice: Subject to any disclaimer, the term of this patent is extended or adjusted under 35 U.S.C. 154(b) by 2574 days.

(21) Appl. No.: 11/179,238

(22) Filed: Jul. 12, 2005

(65) Prior Publication Data

US 2007/0016801 A1    Jan. 18, 2007

(51) Int. Cl.
*H04L 29/06* (2006.01)

(52) U.S. Cl.
USPC .............................................. 726/6; 713/100

(58) Field of Classification Search
USPC ............................................. 726/6; 713/100
See application file for complete search history.

(56) References Cited

U.S. PATENT DOCUMENTS

| 7,023,459 | B2 | 4/2006 | Arndt et al. |
| 7,376,974 | B2 | 5/2008 | Proudler et al. |
| 2003/0226031 | A1 | 12/2003 | Proudler et al. |
| 2005/0149733 | A1 | 7/2005 | Catherman et al. |
| 2006/0020781 | A1 * | 1/2006 | Scarlata et al. ............... 713/100 |

FOREIGN PATENT DOCUMENTS

| JP | 2004303242 A | 10/2004 |
| JP | 2005527900 A | 9/2005 |
| JP | 2005535005 A | 11/2005 |
| KR | 20020070796 | 9/2002 |
| TW | 331607 | 5/1998 |
| TW | 411427 | 11/2000 |
| TW | 432852 | 5/2001 |
| TW | 460849 | 10/2001 |
| WO | 2006011943 A1 | 2/2006 |

OTHER PUBLICATIONS

TPM Main Part 1 Design Principles Specification Version 1.2 Level 2 Revision 103 Jul. 9, 2007 Published TCG Published Copyright TCG 2003-2007.*

* cited by examiner

*Primary Examiner* — Jeffrey Pwu
*Assistant Examiner* — Thong Truong
(74) *Attorney, Agent, or Firm* — Yee & Associates, P.C.

(57) ABSTRACT

A method and apparatus are disclosed in a data processing system for establishing virtual endorsement credentials. The data processing system includes a hardware trusted platform module (TPM). Logical partitions are generated in the system. A different virtual TPM is generated for each one of the logical partitions. For each one of the logical partitions, the virtual TPM that was generated for the logical partition then dynamically generates a virtual endorsement key, which is stored only within a corresponding virtual TPM. Using the virtual endorsement key, each virtual TPM also generates a virtual endorsement credential for use by the logical partition that includes the virtual TPM. The virtual endorsement credential is generated within the data processing system without the data processing system or its devices accessing a trusted third party that is external to the data processing system.

4 Claims, 12 Drawing Sheets

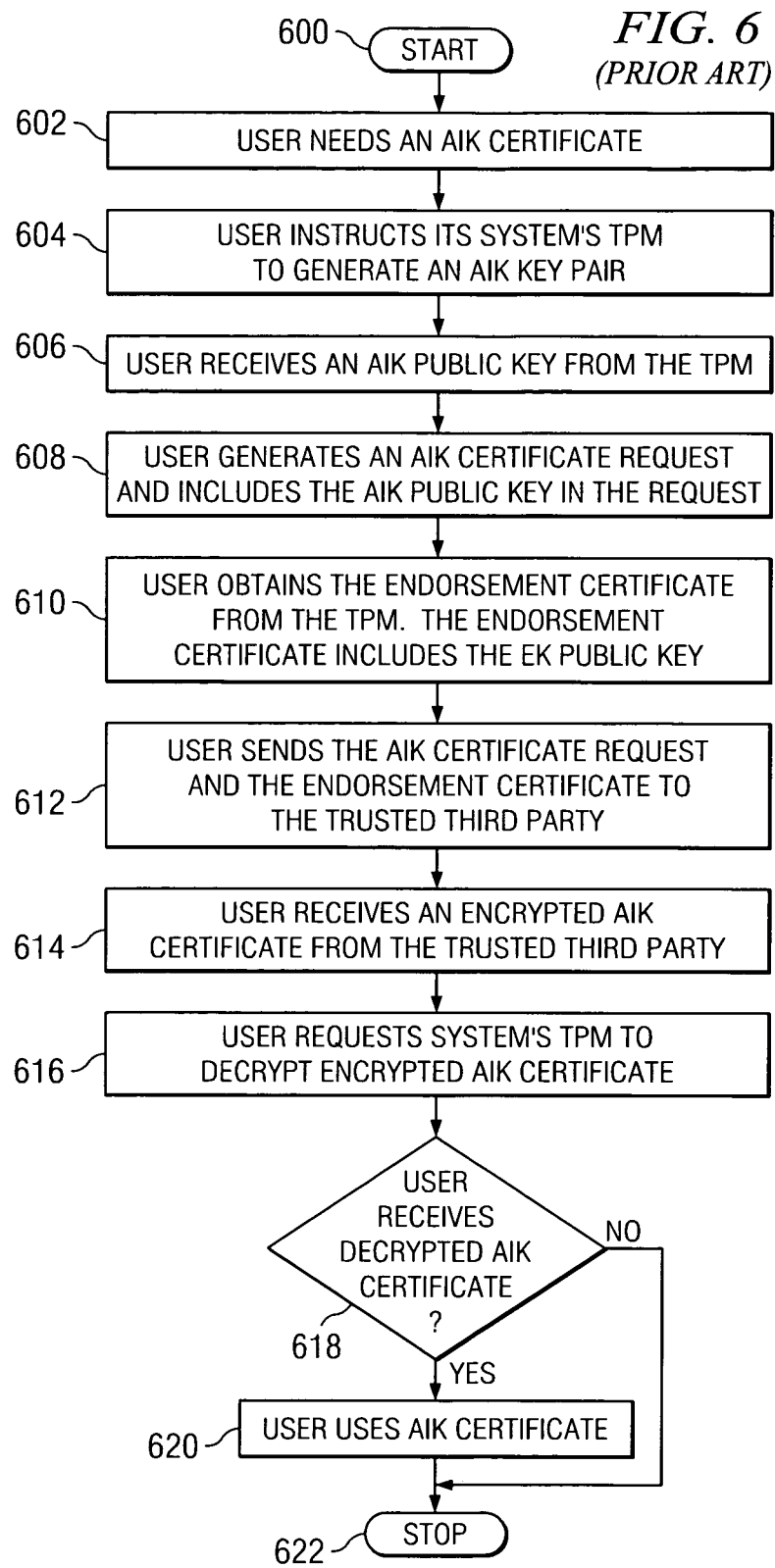

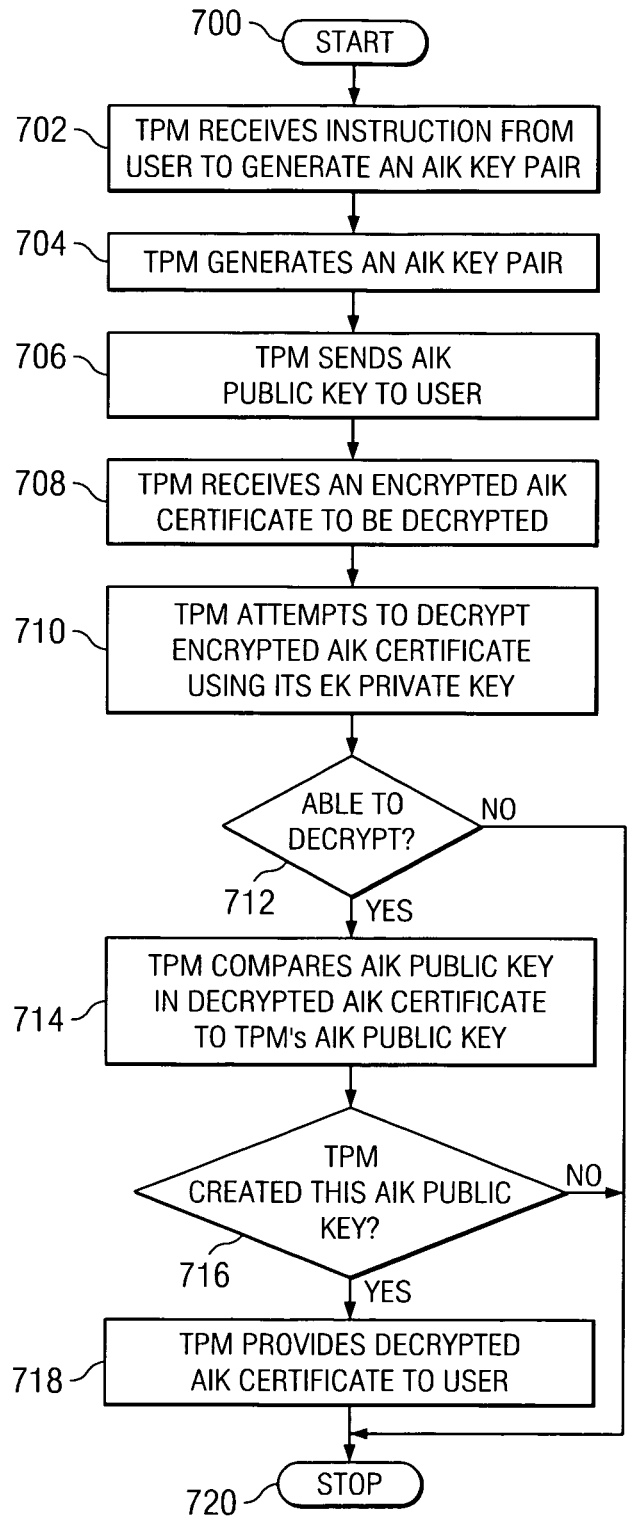

ESTABLISHING VIRTUAL ENDORSEMENT CREDENTIALS FOR DYNAMICALLY GENERATED ENDORSEMENT KEYS IN A TRUSTED COMPUTING PLATFORM

BACKGROUND OF THE INVENTION

1. Field of the Invention

The invention relates to the field of data processing systems, and more specifically to a method, apparatus, and product for establishing virtual endorsement credentials for dynamically generated virtual endorsement keys that are generated for multiple logical partitions in a trusted computing platform.

2. Description of the Related Art

Most data processing systems contain sensitive data and sensitive operations that need to be protected. For example, the integrity of configuration information needs to be protected from illegitimate modification, while other information, such as a password file, needs to be protected from illegitimate disclosure. As another example, a data processing system needs to be able to reliably identify itself to other data processing systems.

An operator of a given data processing system may employ many different types of security mechanisms to protect the data processing system. For example, the operating system on the data processing system may provide various software mechanisms to protect sensitive data, such as various authentication and authorization schemes, while certain hardware devices and software applications may rely upon hardware mechanisms to protect sensitive data, such as hardware security tokens and biometric sensor devices.

The integrity of a data processing system's data and its operations, however, centers around the issue of trust. A data processing system's data and operations can be verified or accepted by another entity if that entity has some manner for establishing trust with the data processing system with respect to particular data items or particular operations.

Hence, the ability to protect a data processing system is limited by the manner in which trust is created or rooted within the data processing system. To address the issues of protecting data processing systems, a consortium of companies has formed the Trusted Computing Group (TCG) to develop and to promulgate open standards and specifications for trusted computing. According to the specifications of the Trusted Computing Group, trust within a given data processing system or trust between a data processing system and another entity is based on the existence of a hardware component within the data processing system that has been termed the trusted platform module (TPM).

A trusted platform enables an entity to determine the state of the software environment in that platform and to seal data to a particular software environment in that platform. The entity deduces whether the state of the computing environment in that platform is acceptable before performing a transaction with that platform.

Present-day computing systems, and in particular large-scale server systems, often include support for running multiple virtual machines. The system may be a large-scale on-demand server system that executes hundreds of server instances on a single hardware platform to support customers with varying computing requirements. In the most flexible of these systems, multiple partitions, which may differ in operating system and application mix, are concurrently present in system memory, and processes executing in each partition are run in an environment that supports their execution on a guest operating system. The virtual machine provides an environment similar enough to a real hardware platform that the operating system can run with little or no modification. A hypervisor (sometimes referred to as a virtual machine monitor) manages all of the virtual machines or partitions and abstracts system resources so that each partition provides a machine-like environment to each operating system instance.

To implement the above architectural goals, multiple processing modules and other devices are installed in a system, and each device generally supports one or more of the above-described partitions, although it is possible to share tasking on a partition between multiple devices. Groups of devices or an individual device may be associated with a particular customer and it is desirable to secure access to a device or group by only that customer including securing the devices from the manufacturer of the devices and system.

In order to provide security in such a system, devices must be bound to the system, avoiding removal and data mining that can occur by either extracting data from a device, or using a device to "impersonate" a system or portion thereof, from which it was extracted. Binding can be physical, e.g., the device is permanently attached to the system, or binding can be accomplished cryptographically, allowing for removable devices and networked systems.

The above-mentioned removable and networked devices provide protection from data tampering or impersonation by refusing to initiate in a system unless the device is cryptographically bound to the system. The information associated with the binding is generally encrypted and is stored in non-volatile storage within the device by the manufacturer. With the above-described mechanism, only a trusted system can access data associated with or stored within a particular device, dramatically reducing the impact of misappropriation or misuse of removable devices. Further, data associated with a device (such as a stored context or "state" of one of the above-mentioned virtual machines) is secured by an encryption mechanism that requires a key that is stored within the associated device or devices. The two-layer mechanism: hardware binding and data encryption keyed to a particular device or devices provides a high level of security against data mining by misappropriation or misuse of removable devices.

A single Endorsement Key (EK) pair is typically stored in a hardware trusted platform module (TPM). Each Endorsement Key pair is unique to the particular hardware TPM in which it is stored. The Endorsement Key pair includes a public Endorsement Key and its corresponding private Endorsement Key. If the public Endorsement Key is used to encrypt data, only the private Endorsement Key that corresponds to that public key is capable of decrypting the encrypted data. If the private Endorsement Key is used to encrypt data, only the public Endorsement Key that corresponds to that private key is capable of decrypting the encrypted data.

The Endorsement Key pair is stored within its TPM by the manufacturer of the TPM when the TPM is manufactured.

In addition to the Endorsement Key, an Endorsement Credential is also stored within the TPM by the manufacturer of the TPM when the TPM is manufactured. The Endorsement Credential includes a copy of the TPM's public Endorsement Key.

The Endorsement Key and Endorsement Credential are used to identify a particular TPM to a trusted third party, which is external to the system that includes the TPM, in order to obtain an Attestation Identity Key (AIK) certificate from the trusted third party. An Attestation Identity Key is used by a system to indicate that the system includes a TPM and that the TPM is valid.

Most known systems use a single hardware TPM to provide trust services to the entire system. One hardware TPM is designed to provide support for a single, non-partitionable computer system. Thus, existing systems utilize a single hardware TPM to provide trust for the entire single system.

High-performance servers, though, support partitionable, multithreaded environments that may need access to a trusted platform module on multiple threads simultaneously. This type of environment allocates, or partitions, physical resources to each of the supported multiple partitions. In addition, each partition can be thought of as a separate logical computer system that can execute its own operating system and applications. The operating system executed by one partition may be different from the operating systems being executed by the other partitions.

For systems that include a single hardware TPM and multiple logical partitions, a need exists for providing a unique Endorsement Key pair and Endorsement Credential for each logical partition. Thus, for example, if the system includes four logical partitions, four separate and unique Endorsement Key pairs and associated Endorsement Credentials would be needed.

It is not practical, however, to generate and store multiple Endorsement Key pairs and Endorsement Credentials in a hardware TPM because the complex systems that include this TPM permit logical partitions to be created and destroyed as needed. Therefore, the number of logical partitions, and thus the number of needed Endorsement Key pairs and Endorsement Credentials, is not known when the TPM is manufactured.

Therefore, a need exists for a method, apparatus, and product for establishing virtual endorsement credentials for dynamically generated virtual endorsement key pairs that are generated for multiple logical partitions in a trusted computing platform.

SUMMARY OF THE INVENTION

A method, apparatus, and computer program product are disclosed in a data processing system for establishing virtual endorsement credentials. The data processing system includes a hardware trusted platform module (TPM). Logical partitions are generated in the system. A different virtual TPM is generated for each one of the logical partitions. For each one of the logical partitions, the virtual TPM that was generated for the logical partition then dynamically generates a virtual endorsement credential for use by the logical partition that includes the virtual TPM. The virtual endorsement credential is generated within the data processing system without the data processing system or its devices accessing a trusted third party that is external to the data processing system.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts a high level flow chart that illustrates a user acquiring an AIK certificate in accordance with the prior art;

FIG. 7 illustrates a high level flow chart that depicts a trusted platform module decrypting an encrypted AIK certificate for a user in accordance with the prior art;

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, apparatus, and computer program product in a data processing system for establishing virtual endorsement credentials. The data processing system includes a hardware trusted platform module (TPM). A platform signing key pair and platform signing key credential are both stored in the hardware TPM by the manufacturer of the TPM when the TPM is manufactured. An endorsement key pair and endorsement credential are not needed or stored in this hardware TPM.

Logical partitions are generated in the system. A different virtual TPM is generated for each one of the logical partitions. For each one of the logical partitions, the virtual TPM that was generated for the logical partition dynamically generates a virtual endorsement key pair for that logical partition. Thus, each logical partition has its own virtual TPM and its own virtual endorsement key pair. Each virtual endorsement key (EK) pair includes an EK public key and its corresponding EK private key.

Each virtual TPM is then capable of dynamically generating a virtual endorsement credential for use by its logical partition. The virtual TPM generates a virtual endorsement credential for use by its logical partition by the virtual TPM signing the logical partition's virtual EK public key using the hardware TPM's platform signing key private key.

In this manner, for each logical partition, a virtual endorsement key pair exists that is unique to that logical partition's virtual TPM. The platform signing key is then used by a logical partition's virtual TPM to bind the logical partition's virtual endorsement key pair to the hardware TPM.

The present invention provides for creating, within a data processing system, a virtual Endorsement Credential for a logical partition without accessing a trusted third party that is external to the system.

In order for a virtual Endorsement Credential to be created by a third party that is external to the data processing system, the logical partition would have to send a virtual endorsement key to the external trusted third party. The external trusted third party would then create the virtual Endorsement Credential and send it back to the system for use by the logical partition. This is not done and is not necessary according to the present invention.

Figure 1A:
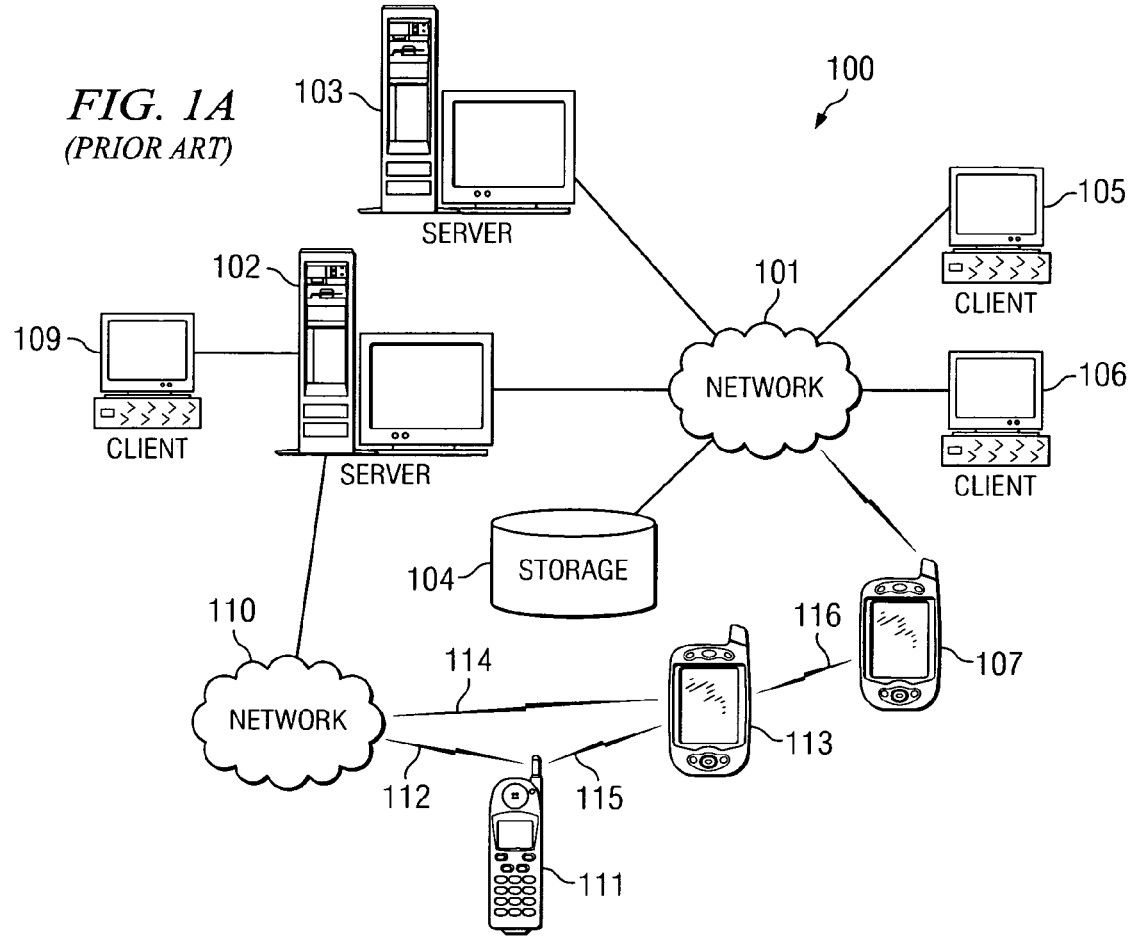
FIG. 1A depicts a typical network of data processing systems, each of which may be used to implement the prior art.

FIG. 1A depicts a network of data processing systems according to prior art. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

Figure 1B:
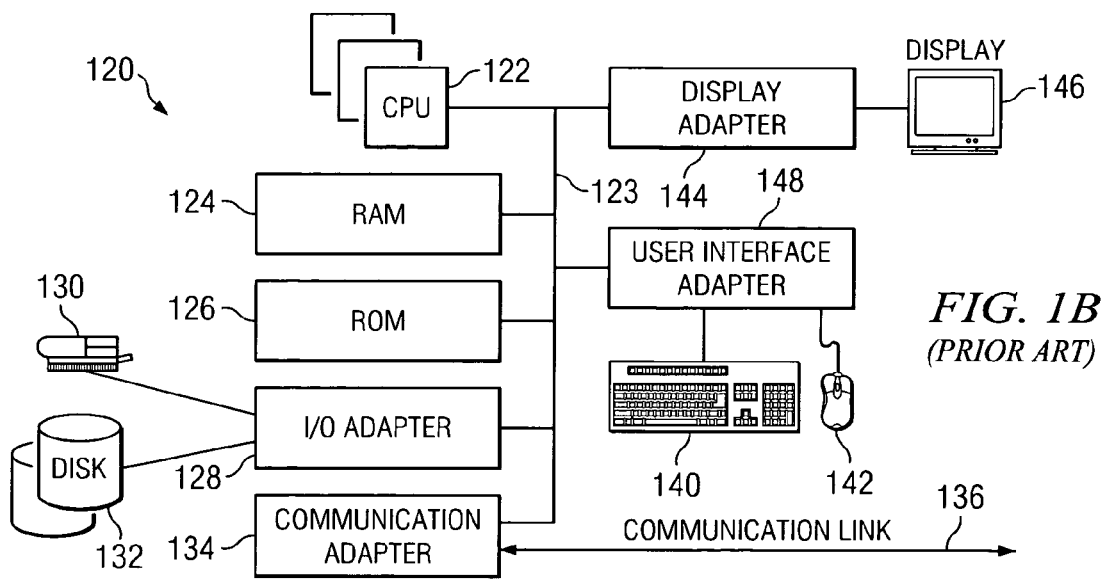
FIG. 1B depicts a computer architecture in accordance with the prior art.

FIG. 1B depicts a computer architecture according to the prior art in which the present invention may be included. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

Figure 1C:
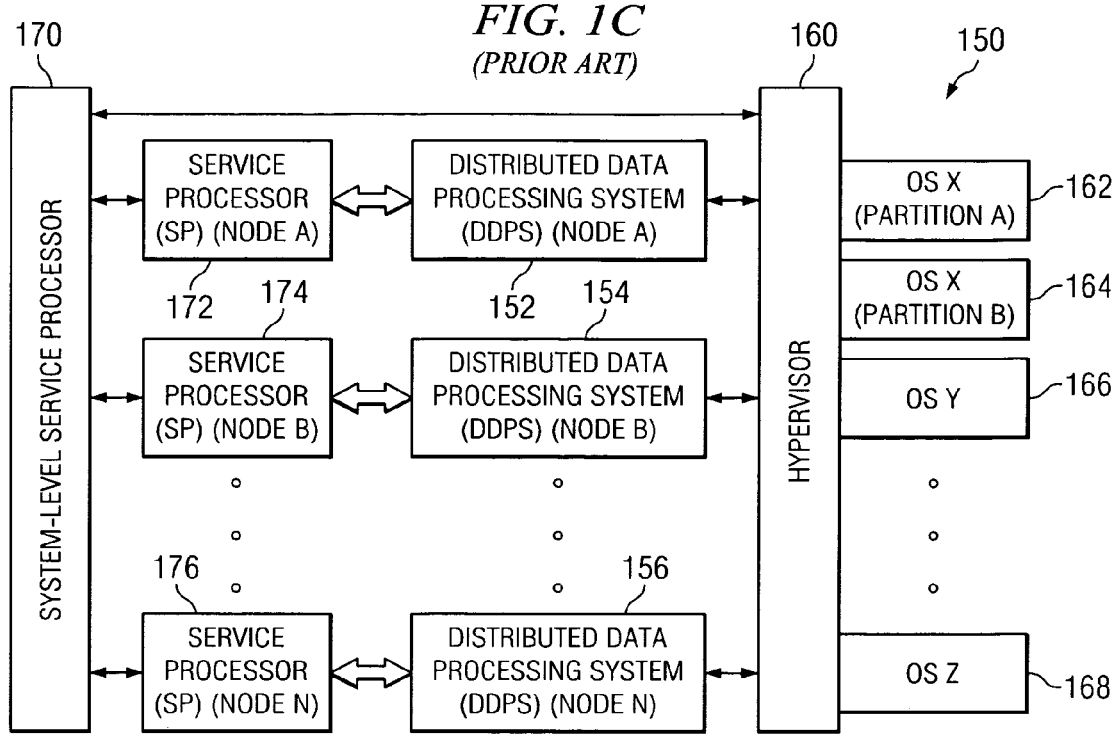
FIG. 1C depicts a block diagram a data processing system in accordance with the prior art.

FIG. 1C depicts a distributed data processing system in accordance with the prior art in which the present invention may be included. Distributed data processing system 150 contains multiple nodes 152-156, each of which may represent a single-processor or multi-processor device or card connected to a communication switch or a network; nodes 152-156 may be implemented as central electronic complex (CEC) units. Hypervisor 160 supports multiple instances of one or more operating systems and/or operating system partitions 162-168 on the shared computational resources of the distributed data processing nodes of system 150. Hypervisor 160 communicates with system-level service processor 170, which is responsible for booting system 150 and for monitoring the availability of the shared resources. Each distributed data processing node is associated with at least one service processor, e.g., service processors 172-176, each of which is responsible for booting its associated node and for assisting system-level service processor 170 in monitoring each of the nodes; a service processor may be associated with a node through a variety of physical connections to its associated node, e.g., the service processor's hardware card may attach to a PCI bus. It should be noted that each node may have a plurality of service processors, although only one service processor would be responsible for booting its associated node.

The present invention could be implemented on a variety of hardware platforms and computational environments; FIG. 1A, FIG. 1B, and FIG. 1C are intended as examples of a heterogeneous computing environment and not as architectural limitations for the present invention.

In addition to being able to be implemented on a variety of hardware platforms and computational environments, the present invention may be implemented in a variety of software environments. A typical operating system may be used to control program execution within each data processing system. For example, one device may run a Unix® operating system, while another device contains a simple Javas runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above. More specifically, though, the present invention is directed to trusted computing platforms.

Figure 1D:
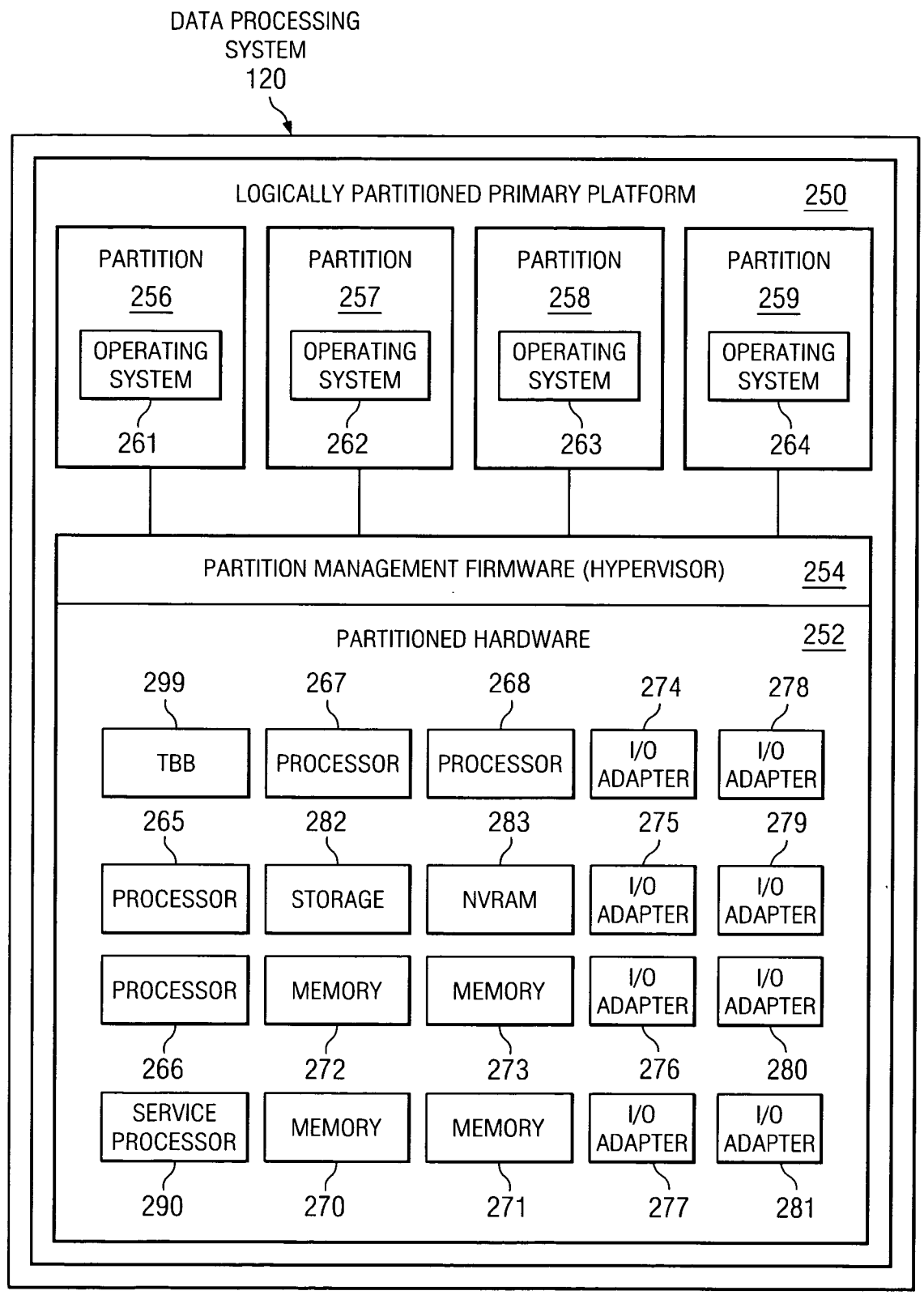
FIG. 1D is a block diagram that illustrates a data processing system that includes multiple different logical partitions in accordance with the present invention.

FIG. 1D is a block diagram of a logically partitioned primary platform that includes the present invention. Logically partitioned primary platform 250 includes partitioned hardware 252, partition management firmware, also called a hypervisor 254, and partitions 256-259. Operating systems 261-264 exist within partitions 256-259. Operating systems 261-264 may be multiple copies of a single operating system or multiple heterogeneous operating systems simultaneously run on platform 250.

Partitioned hardware 252 includes a plurality of processors 265-268, a plurality of system memory units 270-273, a plurality of input/output (I/O) adapters 274-281, and a storage unit 282. Each of the processors 265-268, memory units 270-273, NVRAM storage 283, and I/O adapters 274-281 may be assigned to one of multiple partitions 256-259.

Hypervisor 254 is responsible for partitioning the primary platform 250. Partition management firmware (hypervisor) 254 performs a number of functions and services for partitions 256-259 to create and enforce the partitioning of logically partitioned primary platform 250. Hypervisor 254 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 254 allows the simultaneous execution of independent OS images 261-264 by virtualizing all the hardware resources of logically partitioned platform 250. Hypervisor 254 may attach I/O devices through I/O adapters 274-281 to single virtual machines in an exclusive mode for use by one of OS images 261-264.

Data processing system 120 includes service processor 290. A service processor is a separate hardware partition within system 120 that executes its own operating system.

A trusted building block 299, which includes one or more hardware trusted platform modules, may also be included within platform 250.

Figure 2:
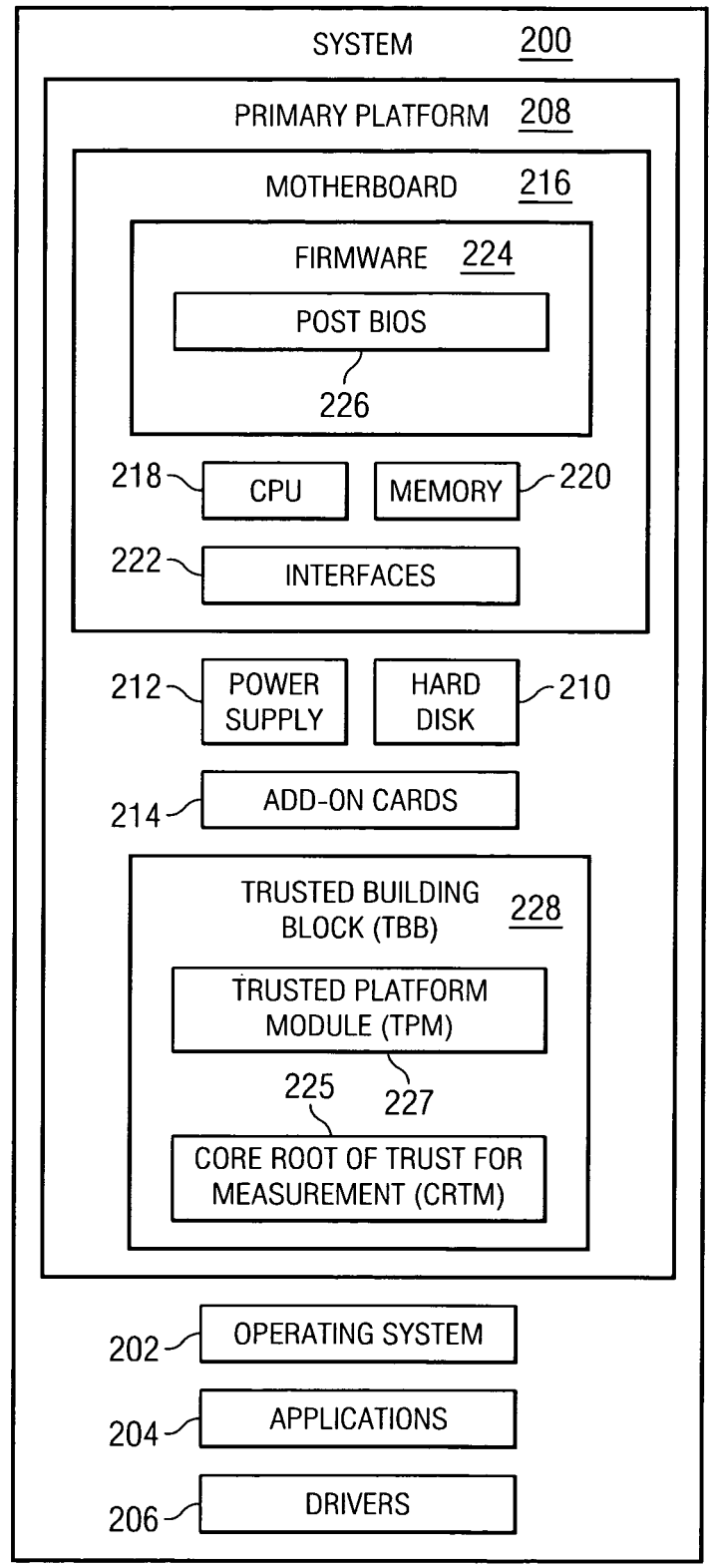
FIG. 2 is a block diagram of a modified hardware trusted platform architecture in accordance with the present invention.

FIG. 2 depicts a trusted platform architecture that has been modified according to the present invention. Except as noted below with regard to the present invention, the remaining components of the TPM operate in accordance with the TCG's PC-specific implementation specification.

A TBB comprises the combination of the core root of trust for measurement (CRTM) component, a trusted platform module (TPM), the connection of the CRTM to motherboard 216, and the connection of the TPM to motherboard 216. For example, TBB 228 includes TPM 227 and CRTM 225.

A TBB provides trust to one of the platforms of system 200. A TBB includes its own CRTM. A CRTM is an immutable portion of a platform's initialization code that executes upon a platform reset. This is the platform for which the TBB that includes the CRTM provides its services.

The platform's execution must begin at the CRTM upon any platform reset event. In this manner, the trust in the platform is based on the CRTM and the behavior of the TPM, and the trust in all measurements is based on the integrity of the CRTM.

For example, the BIOS may be assumed to include a BIOS Boot Block and POST BIOS 226; each of these are independent components that can be updated independent of each other, wherein the manufacturer must control the update, modification, and maintenance of the BIOS Boot Block, but a third party supplier may update, modify, or maintain the POST BIOS component. In the example that is shown in FIG. 2, CRTM 225 may be assumed to be the BIOS Boot Block, and the POST BIOS is a measured component of the chain of trust. Alternatively, the CRTM may comprise the entire BIOS.

The software components may be received through a network, such as network 101 that is shown in FIG. 1A, or they may be stored, e.g., on hard disk 210. Platform 208 receives electrical power from power supply 212 for executing the software components on add-on cards 214 and motherboard 216, which includes typical components for executing software, such as CPU 218 and memory 220, although motherboard 216 may include multiple CPUs. Interfaces 222 connect motherboard 216 to other hardware components within system 200, and firmware 224 contains POST BIOS (power-on self-test basic input/output system) 226.

Figure 3A:
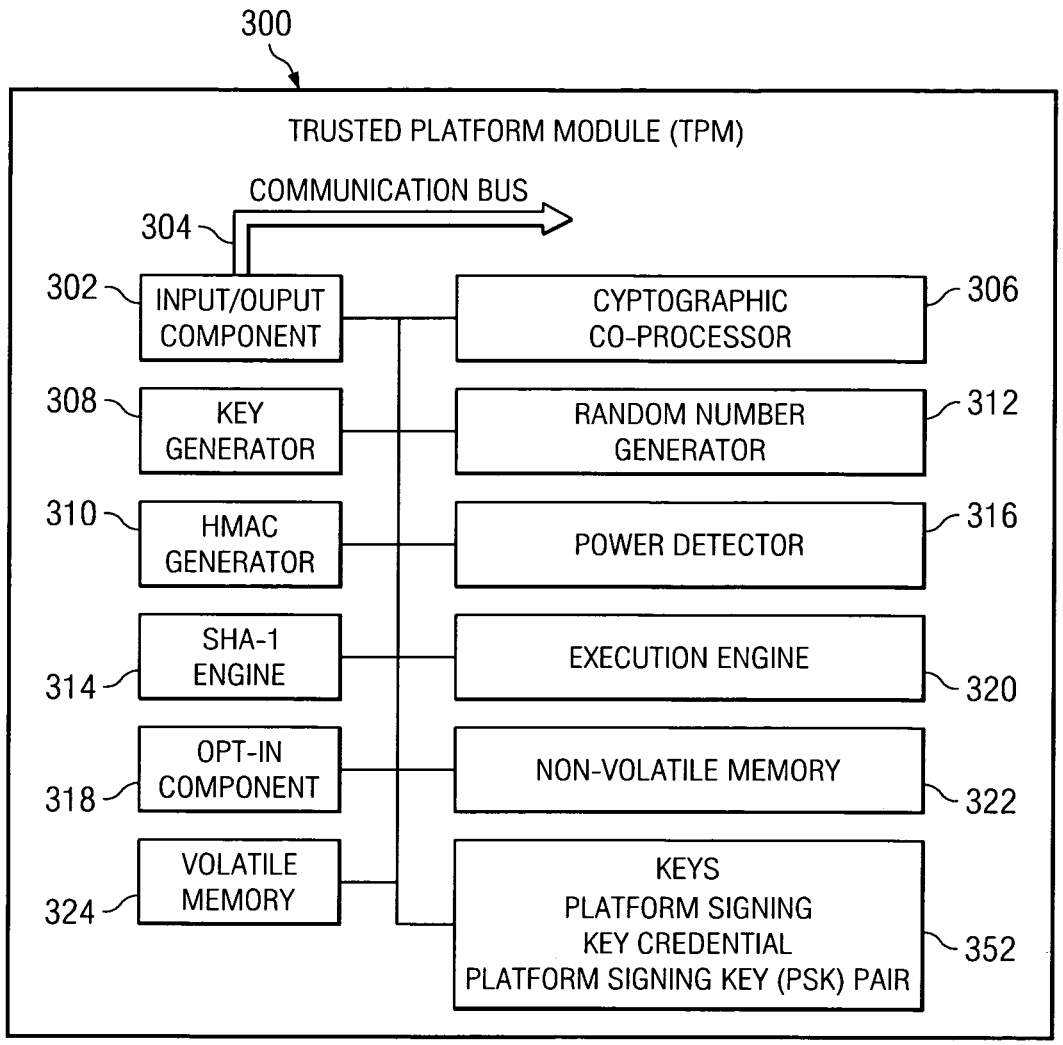
FIG. 3A depicts a block diagram that illustrates a modified hardware trusted platform module (TPM) according to the present invention.

FIG. 3A depicts a block diagram that illustrates a trusted platform module (TPM) that may be utilized to implement the hardware TPM described herein in accordance with the present invention.

Trusted platform module 300 comprises input/output component 302, which manages information flow over communications bus 304 by performing appropriate protocol encoding/decoding operations and routing of messages to appropriate components. Cryptographic co-processor 306 performs cryptographic operations within a trusted platform module. Key generator 308 creates symmetric keys and RSA asymmetric cryptographic key pairs. HMAC engine 310 performs HMAC (Keyed-Hashing for Message Authentication) calculations, whereby message authentication codes are computed using secret keys as integrity checks to validate information transmitted between two parties, e.g., in accordance with Krawczyk et al., "HMAC: Keyed-Hashing for Message Authentication", Request for Comments (RFC) 2104, Internet Engineering Task Force (IETF), February 1997.

Random number generator 312 acts as a source of randomness for the computation of various values, such as nonces, keys, or other values. SHA-1 engine 314 implements the SHA-1 hash algorithm. Power detector 316 manages the power states of a trusted platform module in association with the power states of the platform. Opt-in component 318 maintains the state of persistent and volatile flags and enforces semantics associated with those flags such that the trusted platform module may be enabled and disabled. Execution engine 320 runs program code to execute commands that the trust platform module receives through input/output component 302. Non-volatile memory 322 stores persistent identity and state associated with the trusted platform module; the non-volatile memory may store static data items but is also available for storing dynamic data items by entities that are authorized by the trusted platform module owner, whereas volatile memory 324 stores dynamic data items.

Encryption keys 352 are stored within TPM 300. Various encryption keys may be utilized by TPM 300 in order to authenticate another device and/or to communicate with another device. Although encryption keys 352 are depicted separately from the other components of the TPM, the various encryption keys will typically be stored in non-volatile memory 322.

According to the present invention, the encryption keys include a Platform Signing Key (PSK) and a platform signing key credential. Although other encryption keys may also be stored in keys 352, according to the present invention an endorsement key pair and endorsement key credential are not stored in keys 352.

Figure 3B:
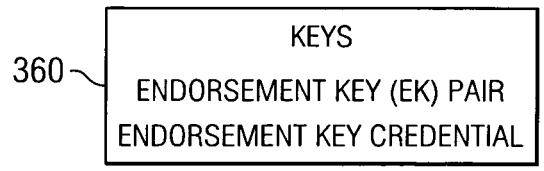
FIG. 3B illustrates a block diagram of keys that are stored in a trusted platform module (TPM) in accordance with the prior art.

FIG. 3B illustrates a block diagram of keys that are stored in a trusted platform module (TPM) in accordance with the prior art. In accordance with the prior art, keys 360 includes an endorsement key pair, which includes a public endorsement key and its corresponding private endorsement key, and endorsement key credential. The endorsement key credential includes the public endorsement key.

Figure 4:
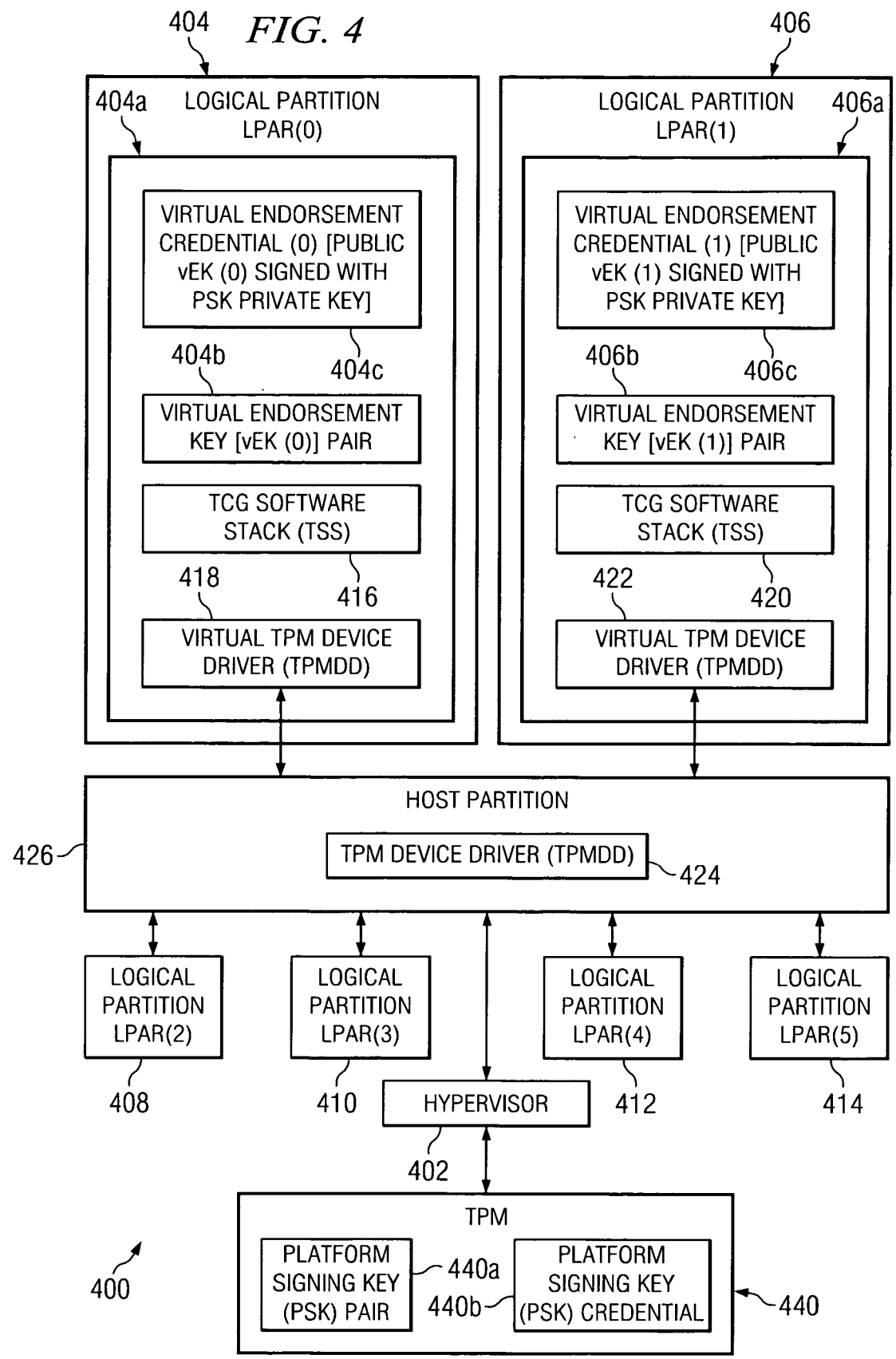
FIG. 4 depicts a block diagram that illustrates a scalable hardware TPM that provides trust to a scalable number of logical partitions in accordance with the present invention.

FIG. 4 depicts a block diagram that illustrates a scalable hardware TPM that provides trust to a scalable number of logical partitions in accordance with the present invention. Data processing system 400 contains a hypervisor 402 that supports multiple instances of one or more operating systems and/or logical partitions (LPAR) on the shared computational resources of data processing system 400. For example, hypervisor 402 supports LPARs 404, 406, 408, 410, 412, and 414.

Each LPAR includes a virtual TPM which includes a TCG software stack (TSS) and a TPM device driver (TPMDD). Each virtual TPM is generated for a logical partition by the hypervisor. For example, LPAR 404 includes TSS 416 and TPMDD 418, while LPAR 406 includes TSS 420 and TPMDD 422. The other LPARs also include a virtual TPM that includes its own TSS and TPMDD that are not depicted. TSS 416 and TSS 420 implement the specification of the host programming interfaces that an operating system, an application, or other software component utilizes to interface with a TPM. TSS comprises: the TSS service provider, to which an entity may interface via common application programming interfaces (APIs); the TSS core services, which provides centralized management of key storage, contexts, and handles the direct interaction with the TPM on the host; and the TPM device driver library and the TPMDD, such as TPMDD 418 or TPMDD 422. Generally, all interfacing to the TPM occurs through TSS service provider interface (TSPI) or an API above the TSPI.

Hypervisor 402 is firmware that is responsible for creating and enforcing the partitioning of platform 208 among the various partitions. Hypervisor 402 provides a set of firmware services to the operating system in each partition so that interference between operating system images is prevented. Each partition includes an operating system executing in that partition that may be the same as or different from the operating system that is executing in the other logical partitions. Hypervisor 402 manages the logical partitions, and allocates and manages the physical devices that are allocated to each partition.

Instead of permitting logical partitions to access a hardware TPM 440 directly, a virtual TPM is presented to each logical partition by the hypervisor. Each virtual TPM utilizes TPM services, in this depiction LPAR 404 and LPAR 406.

According to the present invention, a virtual endorsement key pair and virtual endorsement credential that are unique to a logical partition are created and stored in each logical partition. For example, a virtual endorsement key pair [vEK(0)] 404b is created by virtual TPM 404a for logical partition 404. A virtual endorsement credential 404c is also created by virtual TPM 404a for logical partition 404. Virtual endorsement credential 404c includes a copy of the public virtual endorsement key 404b.

A virtual endorsement key pair [vEK(1)] 406b is created by virtual TPM 406a for logical partition 406. A virtual endorsement credential 406c is also created by virtual TPM 406a for logical partition 406. Virtual endorsement credential 406c includes a copy of the public virtual endorsement key 406b.

Figure 5:
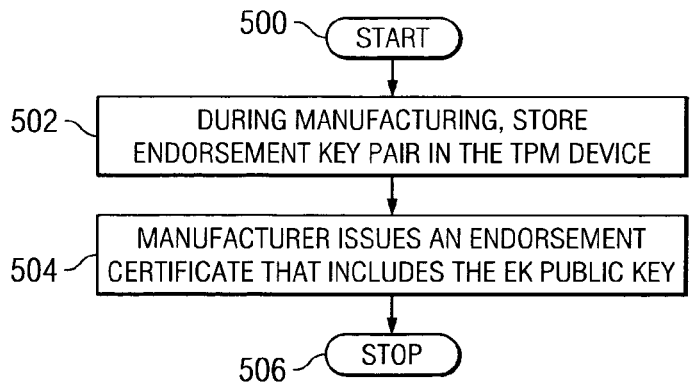
FIG. 5 illustrates a high level flow chart that depicts storing an endorsement key pair and endorsement certificate in a hardware trusted platform module in accordance with the prior art.

FIG. 5 illustrates a high level flow chart that depicts storing an endorsement key pair and endorsement certificate in a hardware trusted platform module in accordance with the prior art. The process starts as depicted by block 500 and thereafter passes to block 502 which illustrates storing an endorsement key pair in a hardware trusted platform module (TPM) during the manufacturing of the TPM. Next, block 504 depicts the manufacturer issuing an endorsement credential for this endorsement key pair. The endorsement credential includes the endorsement public key. The process then terminates as illustrated by block 506.

FIG. 6 depicts a high level flow chart that illustrates a user acquiring an AIK certificate in accordance with the prior art. The process starts as depicted by block 600 and thereafter passes to block 602 which illustrates a user needing an AIK certificate. The user is any user such as an application that is executing on the system.

Attestation Identity Keys are used in the process known as Attestation. Attestation is a process where the hardware TPM digitally signs information that is maintained within the device, and presents it as proof to a third party that the information is protected by a TPM. The AIK is used here to provide anonymity, the theory being that one can have thousands of AIKs and therefore usage cannot be tracked to a specific TPM or system. The AIK credential is evidence that the AIK comes from a TPM, but does not communicate which specific TPM it is from.

Next, block 604 depicts a user telling its system's hardware TPM to generate an AIK key pair. Block 606, then, illustrates the user receiving an AIK public key from the hardware TPM. The process then passes to block 608 which illustrates a user generating an AIK certificate request and including the AIK public key in the request. Thereafter, block 610 depicts the user obtaining the endorsement credential from the hardware TPM. The endorsement credential includes the endorsement key (EK) public key.

Next, block 612 illustrates the user sending the AIK certificate request and the endorsement credential to the trusted third party. Thereafter, block 614 depicts the user receiving an encrypted AIK certificate from the trusted third party. Block 616, then, illustrates the user requesting the system's hardware TPM to decrypt the encrypted AIK certificate.

The process then passes to block 618 which depicts a determination of whether or not the user has received a decrypted AIK certificate. If a determination is made that the user has received a decrypted AIK certificate, the process passes to block 620 which illustrates the user using the AIK certificate. The process then terminates as illustrated by block 622. Referring again to block 618, if a determination is made that the user has not received a decrypted AIK certificate, the process terminates as illustrated by block 622.

FIG. 7 illustrates a high level flow chart that depicts a hardware trusted platform module decrypting an encrypted AIK certificate for a user in accordance with the prior art. The process starts as depicted by block 700 and thereafter passes to block 702 which illustrates a hardware trusted platform module (TPM) receiving, from a user, an instruction to generate an AIK key pair. Next, block 704 depicts the hardware TPM generating an AIK key pair.

Block 706, then, illustrates the TPM sending the AIK public key to the user. Thereafter, block 708 depicts the TPM receiving an encrypted AIK certificate to be decrypted by the hardware TPM. Next, block 710 illustrates the TPM attempting to decrypt the encrypted AIK certificate using the hardware TPM's endorsement key (EK) private key.

Block 712, then, depicts a determination of whether or not the hardware TPM was able to decrypt the AIK certificate using the EK private key. The EK private key is part of a key pair that includes this EK private key and a corresponding EK public key. If the AIK certificate has been encrypted using the corresponding EK public key, the hardware TPM will be able to decrypt the encrypted AIK certificate using the EK private key. This ensures that this hardware TPM's EK key pair was used in the encryption of the AIK certificate. If the AIK certificate was encrypted using an EK public key that does not correspond to this EK private key, the hardware TPM will not be able to decrypt the AIK certificate.

If a determination is made that the hardware TPM was not able to decrypt the encrypted AIK certificate using the hardware TPM's EK private key, the process terminates as illustrated by block 720. Referring again to block 712, if a determination is made that the hardware TPM was able to decrypt the encrypted AIK certificate using the hardware TPM's EK private key, the process passes to block 714 which depicts the hardware TPM comparing the AIK public key that is included in the decrypted certificate to the hardware TPM's AIK public key that the hardware TPM generated in block 704 to determine whether the hardware TPM created this AIK public key.

Block 716, then, depicts a determination of whether or not the hardware TPM created this AIK public key. If a determination is made that the hardware TPM did not create this AIK public key, the process terminates as illustrated by block 720. Referring again to block 716, if a determination is made that the hardware TPM did create this AIK public key, the process passes to block 718 which depicts the hardware TPM providing the decrypted AIK certificate to the user. The process then terminates as illustrated by block 720.

Figure 8:
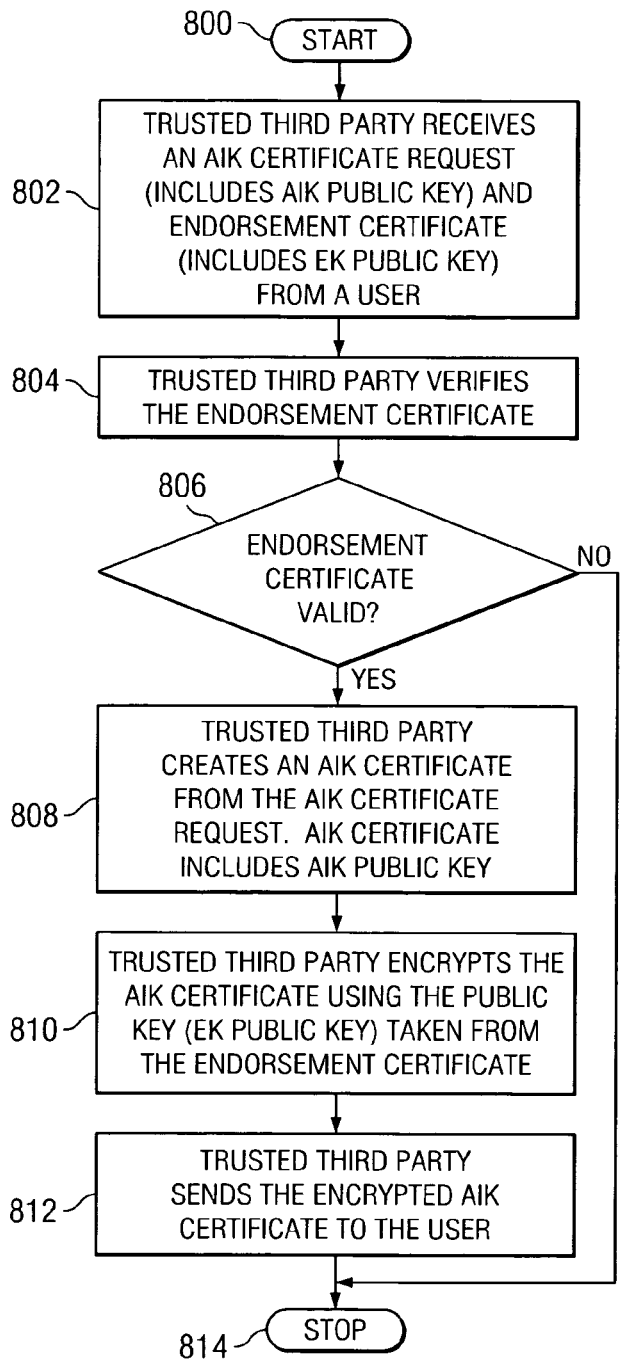
FIG. 8 depicts a high level flow chart that illustrates a trusted third party creating an encrypted AIK certificate and sending it to a requesting user in accordance with the prior art.

FIG. 8 depicts a high level flow chart that illustrates a trusted third party creating an encrypted AIK certificate and sending it to a requesting user in accordance with the prior art. The process starts as depicted by block 800 and thereafter passes to block 802 which illustrates the trusted third party receiving from a user an AIK certificate request and an endorsement credential. The AIK certificate request includes an AIK public key. The endorsement credential includes an EK public key.

The process then passes to block 804 which depicts the trusted third party verifying the endorsement credential by verifying that the certificate was signed by another trusted third party. Block 806, then, illustrates a determination of whether or not the endorsement credential is valid.

Credential, i.e. certificate, verification is done via normal, prior art public key infrastructure (PKI) processing.

Referring again to the present invention, if a determination is made that the endorsement credential is not valid, the process terminates as illustrated by block 814.

Referring again to block 806, if a determination is made that the endorsement credential is valid, the process passes to block 808 which depicts the trusted third party creating an AIK certificate from the AIK certificate request. The AIK certificate will include the AIK public key. Next, block 810 illustrates the trusted third party encrypting the AIK certificate using the public key that was taken from the endorsement credential.

The process then passes to block 812 which depicts the trusted third party sending the encrypted AIK certificate to the user. The process then terminates as illustrated by block 814.

Figure 9:
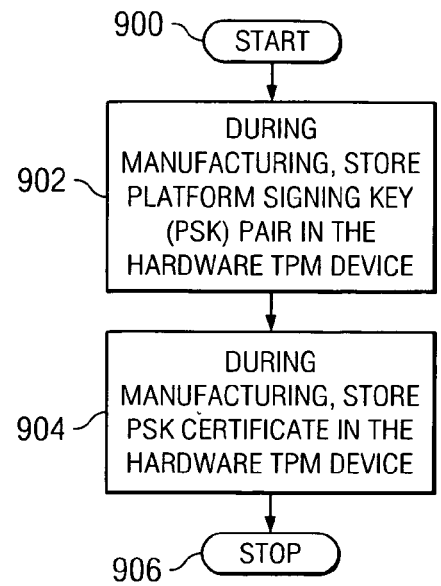
FIG. 9 illustrates a high level flow chart that depicts storing a platform signing key (PSK) pair and platform signing key certificate in a hardware trusted platform module in accordance with the present invention.

FIG. 9 illustrates a high level flowchart that depicts storing a platform signing key (PSK) and platform signing key certificate in a hardware trusted platform module in accordance with the present invention. The process starts as depicted by block 900 and thereafter passes to block 902 which illustrates storing a platform signing key (PSK) pair in a hardware trusted platform module (TPM) during the manufacturing of the hardware TPM. Next, block 904 depicts the manufacturer storing a platform signing key (PSK) certificate in the hardware TPM device during manufacture of the hardware TPM device. The process then terminates as illustrated by block 906.

Figure 10:
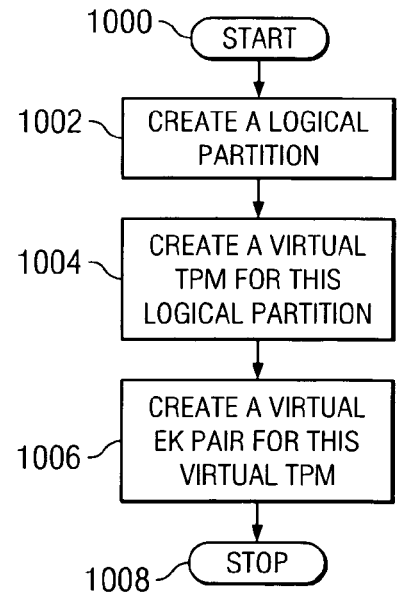
FIG. 10 depicts a high level flow chart that illustrates creating a logical partition and creating a virtual trusted platform module for the logical partition in accordance with the present invention.

FIG. 10 depicts a high level flow chart that illustrates creating a logical partition and creating a virtual trusted platform module for the logical partition in accordance with the present invention. The process starts as depicted by block 1000 and thereafter passes to block 1002 which illustrates creating a logical partition. Next, block 1004 depicts creating a virtual TPM for this logical partition. Block 1006, then, illustrates creating a virtual EK key pair for this virtual TPM. The virtual EK key pair is kept within and used by the virtual TPM. The process then terminates as depicted by block 1008.

Figure 11:
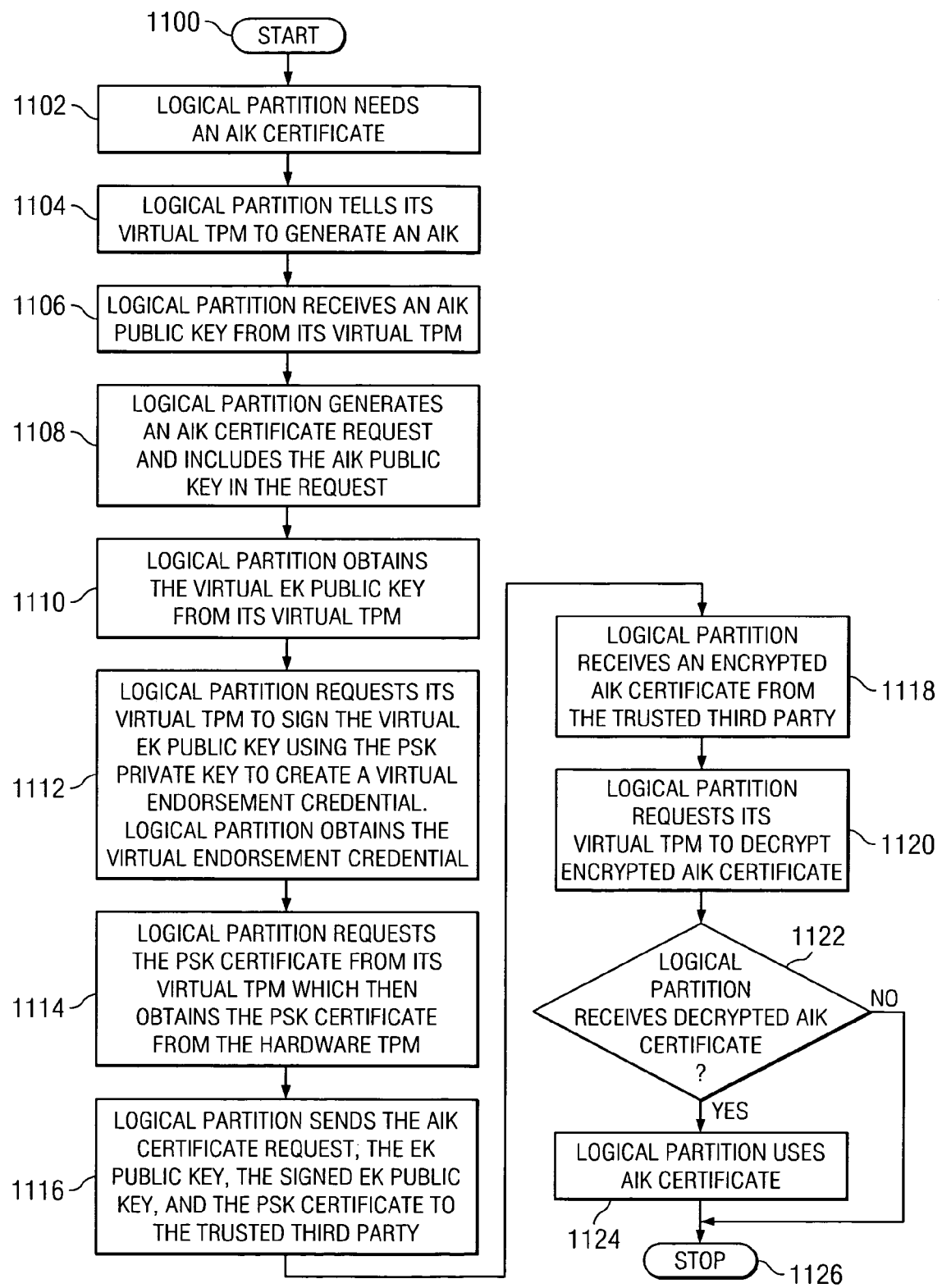
FIG. 11 illustrates a high level flow chart that depicts a logical partition acquiring an AIK certificate in accordance with the present invention.

FIG. 11 illustrates a high level flow chart that depicts a logical partition acquiring an AIK certificate in accordance with the present invention. The process starts as depicted by block 1100 and thereafter passes to block 1102 which illustrates a logical partition needing an AIK certificate.

According to the present invention, an attestation occurs when a virtual TPM digitally signs the information that is maintained within the device. Thus, an AIK certificate is evidence that the AIK included in the certificate came from a TPM, in the case of the present invention, that TPM is a virtual TPM.

Next, block 1104 depicts a logical partition telling its virtual TPM to generate an AIK key pair. Block 1106, then, illustrates the logical partition receiving an AIK public key from its virtual TPM.

The process then passes to block 1108 which illustrates a logical partition generating an AIK certificate request and including the AIK public key in the request. Thereafter, block 1110 depicts the logical partition obtaining the virtual EK public key from its virtual TPM. Next, block 1112 illustrates the logical partition requesting and receiving a virtual endorsement credential from its virtual TPM. A virtual endorsement credential is the virtual EK public key signed, by the partition's virtual trusted platform module, using the PSK private key. The process then passes to block 1114 which depicts the logical partition obtaining the PSK certificate by requesting the PSK certificate from its virtual TPM which then obtains the PSK certificate from the hardware TPM.

The PSK certificate is a credential from a second trusted third party that asserts that the PSK key pair is a key owned and protected by the hardware TPM that virtualizes the virtual TPM. The first trusted third party, which is requested to provide an AIK certificate, uses the PSK certificate to verify that the signed virtual EK public key that was provided to the first trusted third party is from a device that has the correct properties, instead of being from just any entity. The second trusted third party that signed the PSK certificate asserts that the PSK key pair is valid for signing virtual endorsement keys. The first third party trusts the second third party, and therefore accepts the PSK signature on the virtual EK that the first trusted third party received.

Thereafter, block 1116 illustrates the logical partition sending the AIK certificate request, the EK public key (i.e. virtual endorsement credential), the signed EK public key, and the PSK certificate to the trusted third party. Block 1118, then, depicts the logical partition receiving an encrypted AIK certificate from the trusted third party. Next, block 1120 illustrates the logical partition requesting its virtual TPM to decrypt the encrypted AIK certificate.

The process then passes to block 112 which depicts a determination of whether or not the logical partition has received a decrypted AIK certificate. If a determination is made that the logical partition has received a decrypted AIK certificate the process passes to block 1124 which illustrates the logical partition using the AIK certificate. The process then terminates as illustrated by block 1126. Referring again to block 1122, if a determination is made that the user has not received a decrypted AIK certificate, the process terminates as illustrated by block 1126.

Figure 12:
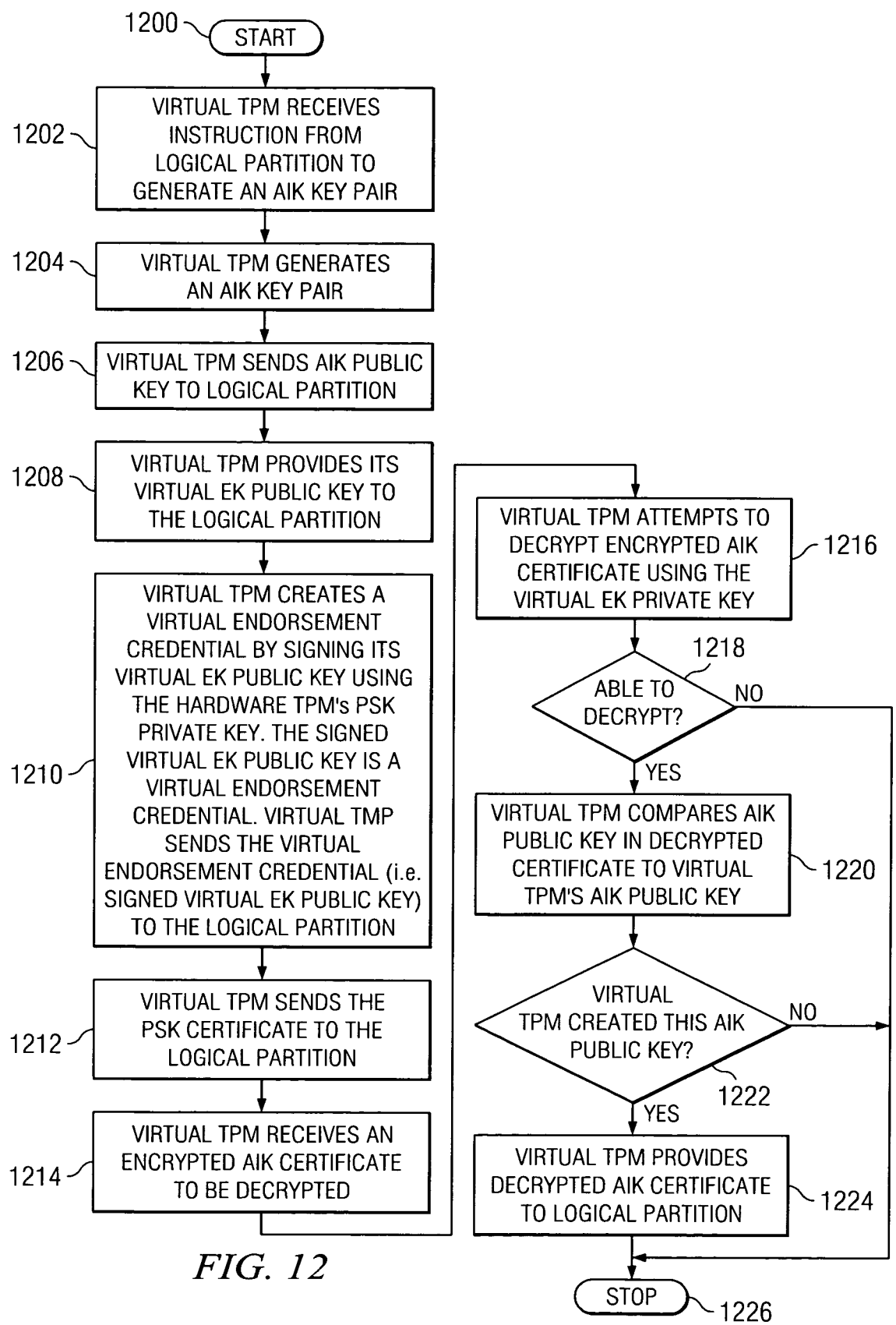
FIG. 12 depicts a high level flow chart that illustrates a virtual trusted platform module creating a virtual endorsement credential and decrypting an encrypted AIK certificate for a logical partition in accordance with the present invention.

FIG. 12 depicts a high level flow chart that illustrates a virtual trusted platform module (TPM) decrypting an encrypted AIK certificate for the virtual TPM's logical partition in accordance with the present invention. The process starts as depicted by block 1200 and thereafter passes to block 1202 which illustrates a virtual trusted platform module (TPM) receiving, from its logical partition, an instruction to generate an AIK key pair. Next, block 1204 depicts the virtual TPM generating an AIK key pair.

The process then passes to block 1206 which illustrates the virtual TPM sending its AIK public key to the logical partition. Block 1208, then, illustrates the virtual TPM providing its virtual EK public key to the logical partition. Thereafter, block 1210 depicts the virtual TPM creating a virtual endorsement credential by signing its virtual EK public key using the hardware TPM's PSK private key. The signed virtual EK public key is a virtual endorsement credential that is unique to the particular logical partition that includes this virtual TPM. The virtual TPM then sends the virtual endorsement credential, i.e. the signed virtual EK public key, to its logical partition.

Block 1212, then, illustrates the virtual TPM sending the PSK certificate to the logical partition. Thereafter, block 1214 depicts the virtual TPM receiving an encrypted AIK certificate to be decrypted. The process then passes to block 1216 which depicts the virtual TPM attempting to decrypt the encrypted AIK certificate using the virtual TPM's virtual EK private key.

Block 1218, then, depicts a determination of whether or not the virtual TPM was able to decrypt the AIK certificate using the virtual TPM's virtual EK private key. If a determination is made that the virtual TPM was not able to decrypt the encrypted AIK certificate using the virtual TPM's virtual EK private key, the process terminates as illustrated by block 1226.

Referring again to block 1218, if a determination is made that the virtual TPM was able to decrypt the encrypted AIK certificate using the virtual TPM's virtual EK private key, the process passes to block 1220 which depicts the virtual TPM comparing the AIK public key that is included in the decrypted certificate to the virtual TPM's AIK public key that the virtual TPM generated in block 1204 to determine whether the virtual TPM created this AIK public key.

Block 1222, then, depicts a determination of whether or not the virtual TPM created this AIK public key. If a determination is made that the virtual TPM did not create this AIK public key, the process terminates as illustrated by block 1226. Referring again to block 1222, if a determination is made that the virtual TPM did create this AIK public key, the process passes to block 1224 which depicts the virtual TPM providing the decrypted AIK certificate to the logical partition. The process then terminates as illustrated by block 1226.

Figure 13:
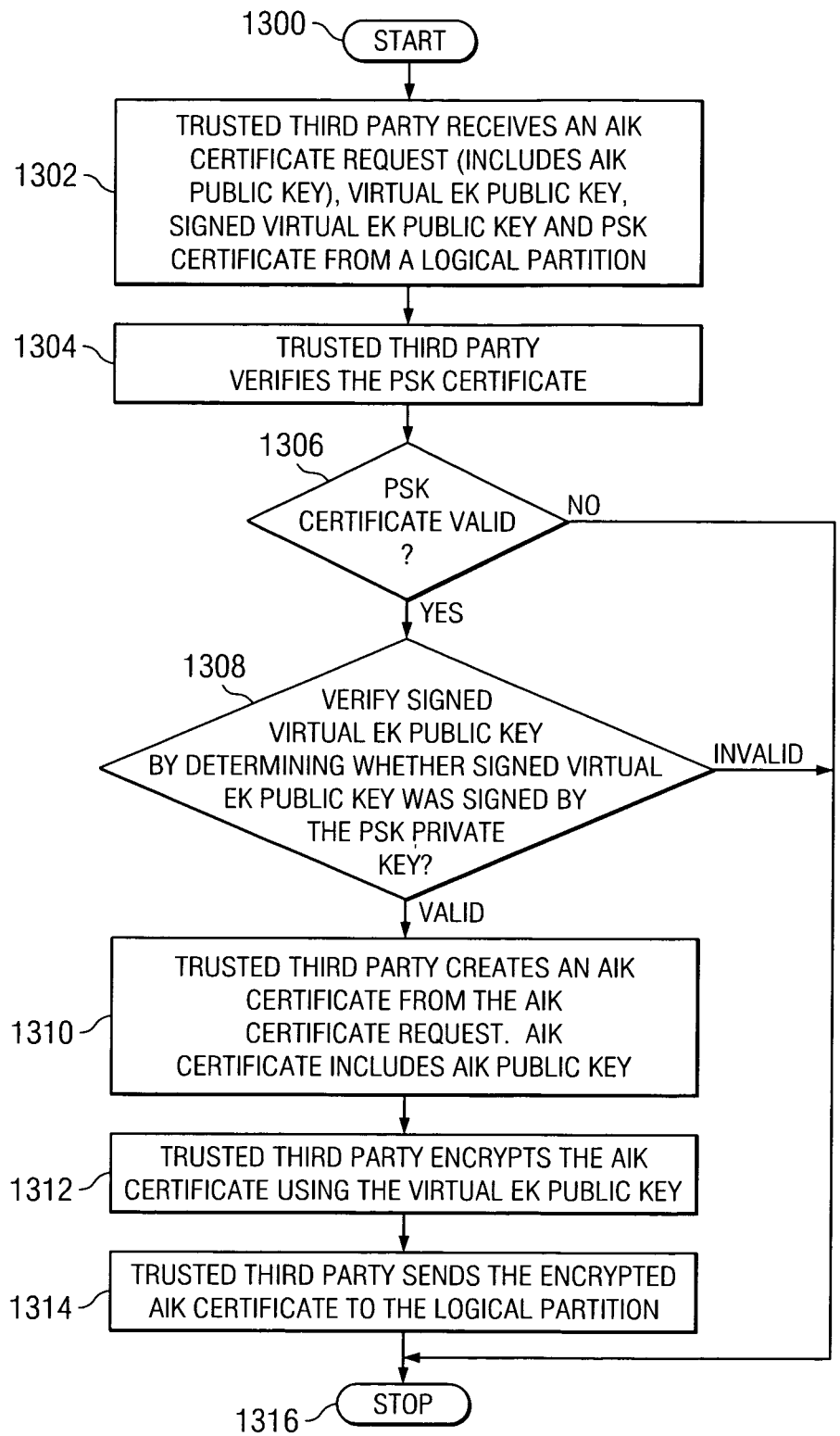
FIG. 13 illustrates a high level flow chart that depicts a trusted third party creating an encrypted AIK certificate and sending it to a requesting logical partition in accordance with the present invention.

FIG. 13 illustrates a high level flow chart that depicts a trusted third party creating an encrypted AIK certificate and sending it to a requesting logical partition in accordance with the present invention. The process starts as depicted by block 1300 and thereafter passes to block 1302 which illustrates the trusted third party receiving from a logical partition an AIK certificate request, a virtual EK public key, a signed virtual EK public key (i.e., a virtual Endorsement certificate), and a PSK certificate. The AIK certificate request includes an AIK public key.

The process then passes to block 1304 which depicts the trusted third party verifying the PSK certificate by verifying that the certificate was signed by another trusted third party. Block 1306, then, illustrates a determination of whether or not the PSK certificate is valid. If a determination is made that the PSK certificate is not valid, the process terminates as illustrated by block 1316.

Referring again to block 1306, if a determination is made that the PSK certificate is valid, the process passes to block 1308 which depicts verifying the signed virtual EK public key by determining whether the signed virtual EK public key was signed by the PSK private key. If a determination is made that the virtual EK public key was not signed by the PSK private key, the process terminates as illustrated by block 1316. Referring again to block 1308 if a determination is made that the virtual EK public key was signed by the PSK private key, and thus the signed virtual EK public key is verified, the process passes to block 1310 which depicts the trusted third party creating an AIK certificate from the AIK certificate request. The AIK certificate will include the AIK public key.

Next, block 1312 illustrates the trusted third party encrypting the AIK certificate using the virtual EK public key. The process then passes to block 1314 which depicts the trusted third party sending the encrypted AIK certificate to the logical partition. The process then terminates as illustrated by block 1314.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for establishing virtual endorsement credentials, said data processing system including a hardware trusted platform module (TPM), said method comprising:
    storing a platform signing key (PSK) in said hardware TPM, but said hardware TPM not including an endorsement key (EK) or endorsement credential (EC);
    generating a plurality of logical partitions in said system;
    for each of said plurality of logical partitions, dynamically generating a different virtual TPM;
    generating, by each of said virtual TPMs, a virtual endorsement key (vEK);
    storing each of said vEKs only within a corresponding virtual TPM;
    generating, by each of said virtual TPMs, a virtual endorsement credential (vEC), for use by said corresponding logical partitions, by signing each of said vEKs using said PSK received from said hardware TPM; and
    each of said vECs being generated within said data processing system without accessing a trusted third party that is external to said data processing system.

2. The method of claim 1, wherein said virtual endorsement key (vEK) includes a virtual endorsement public key and a virtual endorsement private key, for use by said corresponding virtual TPM, the method further comprising:
    storing, in said hardware TPM during manufacturing of said hardware TPM, a PSK certificate;
    in response to receiving a request from a first logical partition to generate an AIK certificate, sending, by a first virtual TPM corresponding to said first logical partition, an AIK public key to said first logical partition;
    generating, by said first logical partition, an AIK certificate request including said AIK public key;
    receiving, by said first logical partition, said corresponding vEK from said first virtual TPM;
    requesting, by said first logical partition, said PSK certificate from said first virtual TPM, said first virtual TPM in turn requesting said PSK certificate from said hardware TPM;
    sending, by said first logical partition, said AIK certificate request, said vEK, and said PSK certificate to a trusted third party;
    receiving, by said first logical partition, said encrypted AIK certificate from said trusted third party; and
    decrypting, by said first virtual TMP, said encrypted AIK certificate for use by said first logical partition.

3. An apparatus in a data processing system for establishing virtual endorsement credentials, said data processing system including a hardware trusted platform module (TPM), said apparatus comprising:
    said hardware TPM for storing a platform signing key (PSK), but not for storing an endorsement key pair (EK) and endorsement credential (EC);
    said system including a plurality of logical partitions;
    for each of said plurality of logical partitions, a hypervisor for dynamically generating a different virtual TPM for each of said plurality of logical partitions;
    each of said virtual TPMs for generating a virtual endorsement key pair (vEK), and for storing each of said vEKs only within a corresponding virtual TPM;
    each of said virtual TPMs for generating a virtual endorsement credential (vEC), for use by said corresponding logical partitions, by signing each of said vEKs using said PSK received from said hardware TPM; and
    each of said vECs being generated within said data processing system without accessing a trusted third party that is external to said data processing system.

4. The apparatus of claim 3, wherein said virtual endorsement key (vEK) includes a virtual endorsement public key and a virtual endorsement private key, for use by said corresponding virtual TPM, the apparatus further comprising:
    said hardware TPM for storing a PSK certificate during manufacturing of said hardware TPM);
    in response to receiving a request from a first logical partition to generate an AIK certificate, a first virtual TPM corresponding to said first logical partition, for sending an AIK public key to said first logical partition;
    said first logical partition for generating an AIK certificate request including said AIK public key;
    said first logical partition for receiving said vEK from said first virtual TPM;
    said first logical partition for requesting said PSK certificate from said first virtual TPM, said virtual TPM in turn for requesting said PSK certificate from said hardware TPM;
    said first logical partition for sending said AIK certificate request, said vEK, and said PSK certificate to a trusted third party;
    said logical partition for receiving an encrypted AIK certificate from said trusted third party; and
    said virtual TMP for decrypting said encrypted AIK certificate for use by said logical partition.

* * * * *